United States Patent Office 3,362,735
Patented Jan. 9, 1968

3,362,735
PRESSURE RING FOR BALL JOINTS
Gottfried Maxeiner, Dusseldorf, Germany, assignor to A. Ehrenreich & Cie., Dusseldorf-Oberkassel Germany
Filed Dec. 12, 1966, Ser. No. 600,812
Claims priority, application Germany, Dec. 14, 1965, E 22,648
3 Claims. (Cl. 287—90)

The present invention relates to a pressure ring of elastic material for a ball joint comprising a joint housing and a ball head journalled therein and equipped with a ball stud while the pressure ring is mounted between a housing cover, the joint housing and bearing cups surrounding the ball head. Such ball joints are employed for instance in motor vehicles.

It is known to provide a resilient pressure ring between the housing cover held by a safety ring, the joint housing and the bearing cups surrounding the ball head. Such pressure ring consists as a rule of an elastic material, as for instance interlaced polyurethane or neoprene, whereas the bearing cups surrounding the ball head are made of a rigid synthetic material, such as polyamide, acetal resin or nylon.

It is an object of the present invention to provide a pressure ring for ball joints which on one hand will prevent the escape of lubricant from the ball housing and on the other hand will prevent soil or dust from entering the joint housing.

It is another object of this invention to provide a pressure ring as set forth in the preceding paragraph, which is simple in construction and application.

These and other objects and advantages of the invention will appear more clearly from the following specification in connection with the accompanying drawing, in which.

Figure 1:
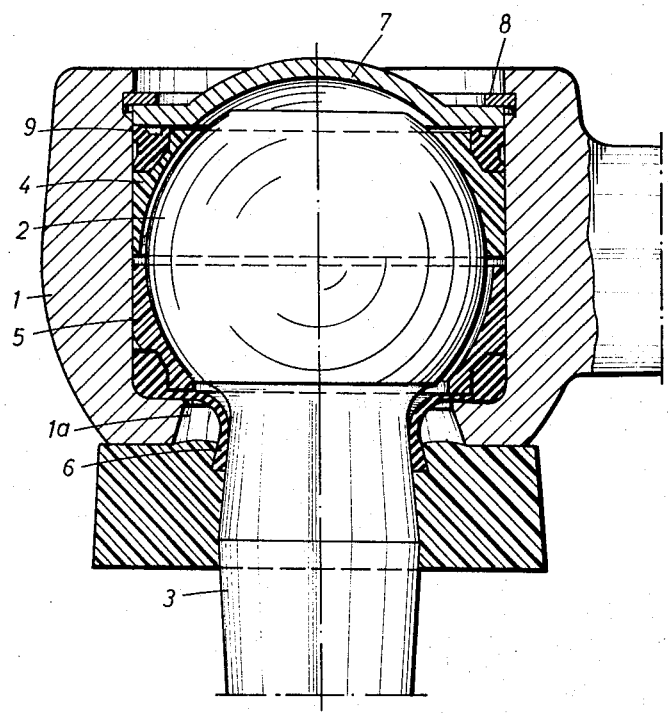
FIG. 1 is a vertical section through a ball joint provided with a pressure ring according to the invention.
Figure 2:
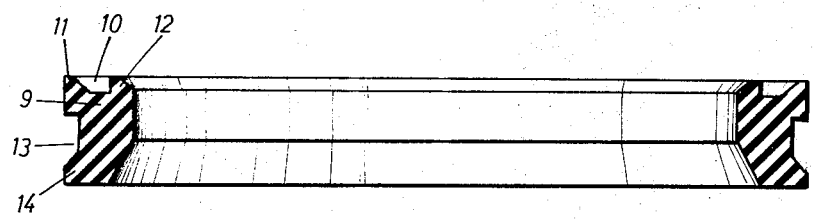
FIG. 2 illustrates on a larger scale than that of FIG. 1 the pressure ring employed in the structure of FIG. 1.

Starting from heretofore known ball joints, the object of the present invention has been realized by so designing of the pressure ring that the latter has those end faces thereof which face the housing provided with at least one circular sealing lip. This shape of the pressure ring yields a labyrinth-like seal for the housing and thus results in an extension of the life span of the entire ball joint.

According to a preferred embodiment of the invention, the pressure ring is advantageously provided with three sealing lips arranged at an angle with regard to each other, the central one of said sealing lips being arranged adjacent to the housing and the housing cover.

Referring now to the drawing in detail, the ball joint shown therein comprises a joint housing 1 which is open at the top and is provided at its bottom with a passage or exit opening 1a. A ball head 2 is journalled in said housing and has connected thereto a ball stud 3 extending through said passage 1a. In said housing 1, the ball head 2 is journalled in bearing cups 4, 5 which may consist of a rigid synthetic material, as for instance acetal resin, nylon, polyamide, or the like. The passage 1a for the ball stud 3 is at the lower end of the housing 1 sealed by a sealing bellows 6. The opening at the top of the housing is closed by a cover 7 which is held in its position by a safety ring 8. Between the housing cover 7 and the upper bearing cup 4 there is provided an elastic ring 9. This ring 9, which may consist of rubber or a soft synthetic material, has that end face thereof which faces the housing cover 7 provided with an annular groove 10 which is formed by two sealing lips 11, 12. The peripheral portion of pressure ring 9 which engages the housing 1 is provided with an additional groove 13 formed by the diagonally directed sealing lip 11 and a further sealing lip 14. In view of the alternate provision of sealing lips 11, 12 and 14 and annular grooves 10, 13 a labyrinth-like seal for the housing 1 will be assured.

It is, of course, to be understood that the present invention is, by no means, limited to the specific construction shown in the drawing but also comprises any modifications within the scope of the appended claims.

What I claim is:

1. A ball joint, especially for motor vehicles, which includes: a housing having one end face provided with a first opening and having the opposite end face provided with a second opening, a bearing cup means mounted in said housing, a ball stud with a ball head journalled in said cup means and with a shank connected to said ball head and extending through said second opening, a closure member closing said first opening for holding said cup means in said housing, said closure member together with said housing and said cup means defining an annular chamber, and elastic pressure ring means arranged under pressure in said annular chamber and located adjacent the gap between said closure member and said housing, said ring means having its outer peripheral surface and the surface facing said closure member respectively provided with at least one annular lip engaging said housing and said closure member respectively under elastic pressure.

2. A ball joint according to claim 1, in which said pressure ring means comprises three spaced sealing lips arranged at an angle with regard to each other, the intermediate one of said sealing lips directly sealing said gap.

3. A ball joint according to claim 1, which includes additional sealing ring means arranged between said housing and said cup means adjacent said second opening, said additional sealing ring means having an annular sleeve-shaped extension sealingly engaging said shank.

References Cited

UNITED STATES PATENTS

| 2,861,827 | 11/1958 | Langen et al. | 287—90 A |
| 3,027,182 | 3/1962 | Reuter | 287—87 |
| 3,086,801 | 4/1963 | Herbenar | 287—90 A |
| 3,177,020 | 4/1965 | Dumpis | 287—87 |
| 3,226,142 | 12/1965 | Herbenar | 287—87 |
| 3,273,923 | 9/1966 | Ulderup | 287—87 |
| 3,273,924 | 9/1966 | Maxeiner | 287—90 A |

FOREIGN PATENTS

| 1,098,381 | 1/1961 | Germany. |

CARL W. TOMLIN, Primary Examiner.

A. KUNDRAT, Assistant Examiner.